(12) United States Patent
Puthenkulam et al.

(10) Patent No.: US 8,868,653 B2
(45) Date of Patent: Oct. 21, 2014

(54) PEER DISCOVERY AND CONNECTION MANAGEMENT BASED ON CONTEXT SENSITIVE SOCIAL NETWORKS

(75) Inventors: Jose P. Puthenkulam, Beaverton, OR (US); Mic Bowman, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 469 days.

(21) Appl. No.: 12/978,016

(22) Filed: Dec. 23, 2010

(65) Prior Publication Data

US 2011/0099274 A1  Apr. 28, 2011

Related U.S. Application Data

(63) Continuation of application No. 12/584,211, filed on Sep. 2, 2009, which is a continuation of application No. 12/220,732, filed on Jul. 28, 2008, now Pat. No. 7,606,860, which is a continuation of application No. 09/948,708, filed on Sep. 10, 2001, now Pat. No. 7,454,464.

(51) Int. Cl.
| | | |
|---|---|---|
| G06F 15/16 | (2006.01) | |
| H04L 29/08 | (2006.01) | |
| H04W 76/02 | (2009.01) | |
| H04W 8/18 | (2009.01) | |

(52) U.S. Cl.
CPC ............... *H04W 76/02* (2013.01); *H04L 67/14* (2013.01); *H04W 8/18* (2013.01); *H04L 67/22* (2013.01); *H04L 67/104* (2013.01); *H04L 69/329* (2013.01)
USPC ................................. 709/204; 709/229; 726/4

(58) Field of Classification Search
USPC ............... 709/204, 224, 227, 228, 229; 726/4
See application file for complete search history.

(56) References Cited

U.S. PATENT DOCUMENTS

| | | | |
|---|---|---|---|
| 6,044,466 A | 3/2000 | Anand et al. | |
| 6,108,688 A | 8/2000 | Nielsen | |
| 6,141,686 A | 10/2000 | Jackowski et al. | |
| 6,339,784 B1 * | 1/2002 | Morris et al. | 709/204 |
| 6,393,464 B1 | 5/2002 | Dieterman | |
| 6,453,327 B1 | 9/2002 | Nielsen | |
| 6,484,197 B1 | 11/2002 | Donohue | |
| 6,546,416 B1 | 4/2003 | Kirsch | |
| 6,697,840 B1 * | 2/2004 | Godefroid et al. | 709/205 |

(Continued)

OTHER PUBLICATIONS

Advisory Action received in U.S. Appl. No. 13/072,461, mailed on Jun. 4, 2012, 4 pages.

(Continued)

*Primary Examiner* — Douglas Blair
(74) *Attorney, Agent, or Firm* — Barre Law Firm (57) ABSTRACT

In a method for automatically filtering communications, a networking request from an initiating party on an initiating communication device is received. The networking request pertains to a request for communication between the initiating communication device and a recipient communication device of a user over a communication channel. A determination is made of whether the communication channel to be used for the communication matches a communication channel for a previous communication between the initiating party and the user. It is automatically determined whether to grant the networking request, based at least in part on the determination of whether the communication channel for the communication matches the communication channel for the previous communication between the initiating party and the user. Other embodiments are described and claimed.

12 Claims, 10 Drawing Sheets

(56) References Cited

U.S. PATENT DOCUMENTS

| | | | |
|---|---|---|---|
| 6,810,419 B1 | 10/2004 | Bogler et al. | |
| 6,823,368 B1 | 11/2004 | Ullmann et al. | |
| 6,832,245 B1 | 12/2004 | Isaacs et al. | |
| 6,839,735 B2 | 1/2005 | Wong et al. | |
| 6,868,436 B1 | 3/2005 | Fleming, III | |
| 6,941,304 B2 | 9/2005 | Gainey et al. | |
| 6,965,919 B1 | 11/2005 | Woods et al. | |
| 6,968,052 B2 * | 11/2005 | Wullert, II | 379/210.01 |
| 7,072,942 B1 | 7/2006 | Maller | |
| 7,092,509 B1 | 8/2006 | Mears et al. | |
| 7,249,123 B2 | 7/2007 | Elder et al. | |
| 7,257,569 B2 | 8/2007 | Elder et al. | |
| 7,269,590 B2 | 9/2007 | Hull et al. | |
| 7,359,894 B1 | 4/2008 | Liebman et al. | |
| 7,360,165 B2 | 4/2008 | Cortright et al. | |
| 7,379,972 B2 | 5/2008 | Landesmann et al. | |
| 7,454,464 B2 * | 11/2008 | Puthenkulam et al. | 709/204 |
| 7,454,470 B1 | 11/2008 | Isaacs et al. | |
| 7,512,655 B2 | 3/2009 | Armstrong et al. | |
| 7,606,860 B2 * | 10/2009 | Puthenkulam et al. | 709/204 |
| 7,680,819 B1 * | 3/2010 | Mellmer et al. | 707/783 |
| 7,725,525 B2 | 5/2010 | Work | |
| 7,962,561 B2 * | 6/2011 | Landesmann | 709/206 |
| 8,001,190 B2 * | 8/2011 | Bernstein et al. | 709/206 |
| 8,392,420 B2 * | 3/2013 | Mellmer et al. | 707/737 |
| 8,631,038 B2 * | 1/2014 | Mellmer et al. | 707/783 |
| 2001/0023432 A1 | 9/2001 | Council et al. | |
| 2002/0052855 A1 | 5/2002 | Landesmann | |
| 2003/0028430 A1 * | 2/2003 | Zimmerman | 705/14 |
| 2003/0088627 A1 | 5/2003 | Rothwell et al. | |
| 2004/0171396 A1 * | 9/2004 | Carey et al. | 455/466 |
| 2005/0044423 A1 * | 2/2005 | Mellmer et al. | 713/201 |
| 2006/0031772 A1 | 2/2006 | Valeski | |
| 2008/0071876 A1 | 3/2008 | Landesmann et al. | |
| 2011/0208653 A1 | 8/2011 | Landesmann | |
| 2011/0208778 A1 * | 8/2011 | Mellmer et al. | 707/783 |
| 2012/0030295 A1 * | 2/2012 | Bernstein et al. | 709/206 |
| 2013/0124650 A1 * | 5/2013 | Bernstein et al. | 709/206 |
| 2013/0191472 A1 * | 7/2013 | Bernstein et al. | 709/206 |

OTHER PUBLICATIONS

Office Action received for U.S. Appl. No. 09/948,708, mailed on Sep. 29, 2004, 11 pages.
Office Action received for U.S. Appl. No. 09/948,708, mailed on Jun. 9, 2005, 6 pages.
Office Action received for U.S. Appl. No. 09/948,708, mailed on Jan. 24, 2006, 9 pages.
Office Action received for U.S. Appl. No. 09/948,708, mailed on Aug. 9, 2006, 13 pages.
Office Action received for U.S. Appl. No. 09/948,708, mailed on Apr. 27, 2007, 15 pages.
Office Action received for U.S. Appl. No. 09/948,708, mailed on Dec. 13, 2007, 6 pages.
Office Action received for U.S. Appl. No. 12/220,732, mailed on Jan. 16, 2009, 6 pages.
Office Action received for U.S. Appl. No. 12/584,211, mailed on Jun. 30, 2011, 8 pages.
Office Action received for U.S. Appl. No. 12/584,211, mailed on Jan. 28, 2011, 12 pages.
Office Action received for U.S. Appl. No. 13/072,461, mailed on Oct. 31, 2011, 12 pages.
Office Action received for U.S. Appl. No. 13/072,461, mailed on Mar. 19, 2012, 9 pages.
Notice of Allowance received for U.S. Appl. No. 09/948,708, mailed on Apr. 23, 2008, 5 pages.
Notice of Allowance received for U.S. Appl. No. 12/220,732, mailed on Jun. 2, 2009, 5 pages.
Office Action received for U.S. Appl. No. 13/072,461, mailed on Jan. 9, 2014, 8 pages.
Office Action received for U.S. Appl. No. 12/584,211, mailed on Mar. 18, 2014, 9 pages.
Final Office Action received for U.S. Appl. No. 13/072,461 mailed on May 27, 2014, 11 pages.
Office Action received for U.S. Appl. No. 12/584,211, mailed on Aug. 26, 2014, 8 pages.

* cited by examiner

PEER DISCOVERY AND CONNECTION MANAGEMENT BASED ON CONTEXT SENSITIVE SOCIAL NETWORKS

CROSS-REFERENCE TO RELATED APPLICATIONS

The present application is a continuation of U.S. patent application Ser. No. 12/584,211, entitled "Peer Discovery And Connection Management Based On Context Sensitive Social Networks," filed Sep. 2, 2009, now pending, which is a continuation of U.S. patent application Ser. No. 12/220,732, entitled "Peer Discovery And Connection Management Based On Context Sensitive Social Networks," filed Jul. 28, 2008, now U.S. Pat. No. 7,606,860, which is a continuation of U.S. patent application Ser. No. 09/948,708, entitled "Peer Discovery And Connection Management Based On Context Sensitive Social Networks," filed on Sep. 10, 2001, now U.S. Pat. No. 7,454,464. The entire teachings of the above applications are incorporated herein by reference.

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to networking. Other aspects of the present invention relate to network connection management.

Ad-hoc networking refers to the concept of multiple communication devices discovering, connecting, and interacting with each other when in proximity. An ad-hoc network may be formed using a scheme of broadcast and response. For example, in an environment of wireless services, a handheld device may discover other devices that are in a close range by broadcasting a connection or networking request through a broadcast address (or a multicast address). The devices that receive the networking request (or receiving devices) need to respond to the networking request.

A response issued from a receiving device may be granting the networking request or denying the networking request. In the former case, the receiving device grants the networking request and agrees to participate in an ad-hoc network. In the latter case, the receiving device denies the networking request and refuses to participate in the ad-hoc network.

In responding to a networking request, it may be annoying when users receive requests from people they are not acquainted with. It may even cause distress when a user receives frequent networking requests. More severely, a flood of incoming networking requests may disrupt or even disable a receiving device. In this case, the receiving device may not be able to respond at all. Another problem associated with this scheme is that it does not scale well when moderately or dense population is involved.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
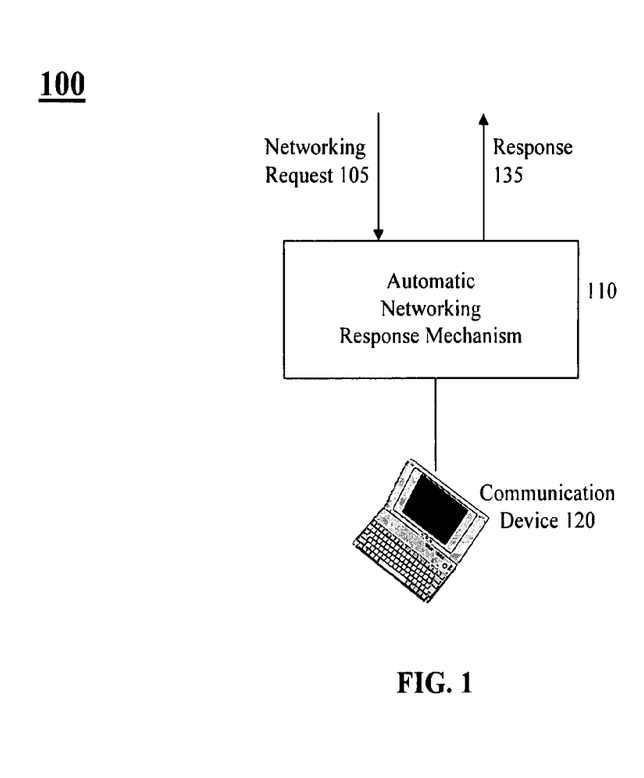
FIG. 1 depicts a mechanism, in which a communication device responds to a networking request via an automatic networking response mechanism according to embodiments of the present invention.

FIG. 1 depicts a mechanism 100, in which a communication device 120 responds to a networking or connection request 105 via an automatic networking response mechanism 110 according to embodiments of the present invention. The communication device 120 represents a generic device that is capable of communicating with another communication device to send and receive signals. For example, the communication device 120 may be a hand held device such as a cellular phone or a Personal Data Assistance (PDA). The communication device 120 also includes any computing device that possesses communication capability.

The communication between the communication device 120 and a different communication device may be initiated by either party and the one that initiates the communication is the initiating party. For instance, the communication device 120 may initiate the communication by sending a networking request to one or more devices to request to establish network connections (not shown in FIG. 1). When a different device initiates the communication as an initiating party, the initiating party sends a networking request 105 to the communication device 120 to start a connection. The networking request 105 may be characterized as including one or more data transmissions containing data requesting a connection expressed according to certain standards.

In mechanism 100, an automatic networking response mechanism 110 intercepts the networking request 105 and generates a response 135 automatically based on a dynamic social network model. The response 135 may comprise one or more data transmissions, in response to the networking request 105 with one or more data transmissions. A dynamic social network model (discussed in more detail later) may describe the user's social circle based on the communication information collected while the user interacts with various contacts. For example, if a user has frequent email exchanges with a particular contact, the high frequency of the interaction may be recorded and used to infer that the user is close to the contact (either professionally or personally). When such characterization for each contact is available, it may be used to determine whether to accept a particular networking request from a contact. For instance, the closer the user is to a contact, the more likely a networking request from the contact is to be accepted.

A social network model may be established with respect to a user, characterizing the social network of the user. It may also be established for an entity capable of communications such as a web-based software robot or an intelligent communication device. When there are multiple users on a single communication device 120, the social network of each user may be modeled and applied separately. In this case, the automatic networking response mechanism 110 may employ an appropriate social network model for each user according to, for example, the login name of a user and make a responding decision based on the current user's social network model. It is also possible to model the social network of a group of users such as a family or a working team. In this case, the corresponding social network model represents a single entity representing the group.

Figure 2:
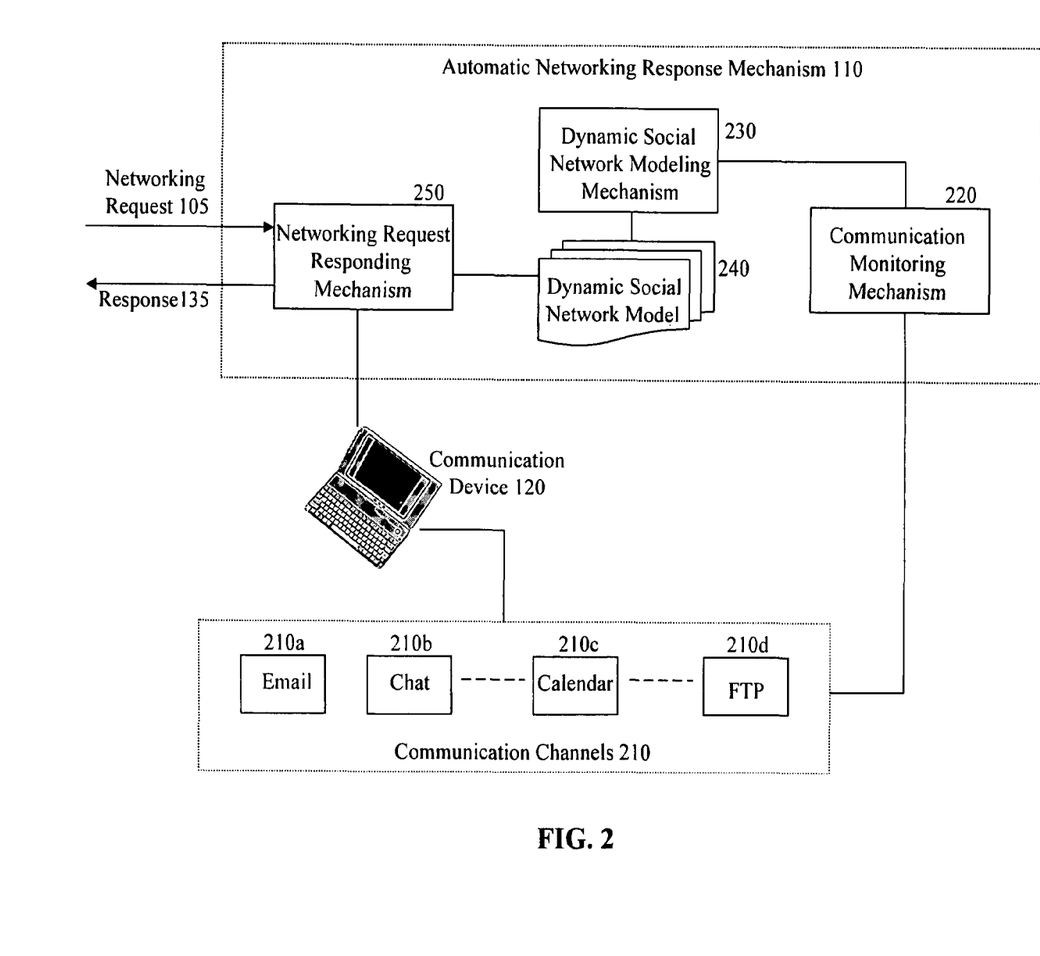
FIG. 2 depicts the high level internal structure of an automatic networking response mechanism in relation to a communication device according to an embodiment of the present invention.

FIG. 2 depicts the high level internal structure of the automatic networking response mechanism 110 in relation to the communication device 120 according to an embodiment of the present invention. The automatic networking response mechanism 110 comprises a communication monitoring mechanism 220, a dynamic social network modeling mechanism 230 that builds a dynamic model 240 to characterize a user's social network based on the monitoring data collected by the communication monitoring mechanism 220, and a networking request responding mechanism 250 that makes a responding decision based on the social network model 240.

Communications between two communication devices may occur at different layers. Such communication layers may include physical layer, communication stack layer, and application layer. The communication activities at different layers may be governed based on different criteria. For example, even though a networking request, issued from an initiating communication device, may be denied at application layer by a receiving device, two devices may still communicate at physical layer (e.g., hand-shake so that the two devices are aware of the existence of each other). Different responding mechanisms may be required for different layers. The automatic networking response mechanism 110, depicted in FIG. 2, is responsible to respond a networking request at application layer.

The communication monitoring mechanism 220 monitors the communication activities between the communication device 120 and other devices. Communication activities may be conducted via different communication channels 210 such as email 210a, chat room 210b, event scheduling via calendar 210c, and file transport protocol (FTP) 210d. Communication activities may also include (not shown in FIG. 2) instant messaging, website interactions based on HTTP, or database based interactions using transactions.

The communication monitoring mechanism 220 may collect useful information associated with different aspects of the user's communication. It may monitor all communication activities, including internal initiated communications (e.g., sending out emails) and external party initiated communications (e.g., an instant messaging session initiated by a party on a different device). For example, it may observe and gather the information about the identity of the user's communicating party (that communicates with the user), the time and date of each communication session, the length in time of each communication session, or the frequency of the communication with the same party.

The communication monitoring mechanism 220 collects information with respect to a user. That is, each logic pool of data collected corresponds to a single user. When multiple users are involved, the communication monitoring mechanism 220 may create multiple pools of monitoring data, each of which may be created according to, for example, the login name of the corresponding user. Within each pool of such collected data may contain a plurality of monitored communication sessions. Since in each session, the user may communicate with a single contact, the corresponding pool of information, collected during the session, may be labeled with the identity of the contact. The collected information may include the starting and ending time of each session, the date, the communication channel used (e.g., email, chat, etc.), the location of the user during the session, and the statistics such as up-to-date frequency of the communication between the user and the contact.

The information collected through the communication monitoring mechanism 220 can be selectively accessed by the dynamic social network modeling mechanism 230 and used to establish a user's social network model 240. For example, the dynamic social network modeling mechanism 230 may select only the information about communications that are initiated by an external device. Such information may include the time and date the networking request is made, the response (e.g., accepted or denied) from the user, and the data associated with the communication session (e.g., how long it lasted on what communication media).

Each dynamic social network model built with respect to a single user (or generically a single entity, representing either a user or a group of users) characterizes the networking pattern of the user. A dynamic social network model may contain a list of contacts, each of which may be individually modeled. For example, each contact may be classified into some category (i.e., family friend, co-worker) and the relationship between the user and the contact may be rated (e.g., close friend, or casual encounter).

Whenever a networking request 105, sent from an initiating party to a user of the communication device 120, is intercepted, the networking request responding mechanism 250 may first retrieve an appropriate dynamic social network model 240 corresponding to the user. The identity of the initiating party may be identified and used to look up the dynamic social model 240 to verify whether the initiating party is one of the contacts described in the model. The networking request responding mechanism 250 makes a responding decision (either accept or reject the networking request and sends the response 135 back to the initiating party.

If the networking request is accepted, the communication device 120 connects to the initiating party (or contact) via one of its communication channels to start a communication session. During the communication session, the communication monitoring mechanism 220 monitors the session, collecting useful data so that dynamic information can be recorded and used to update the existing social network model 240.

Figure 3:
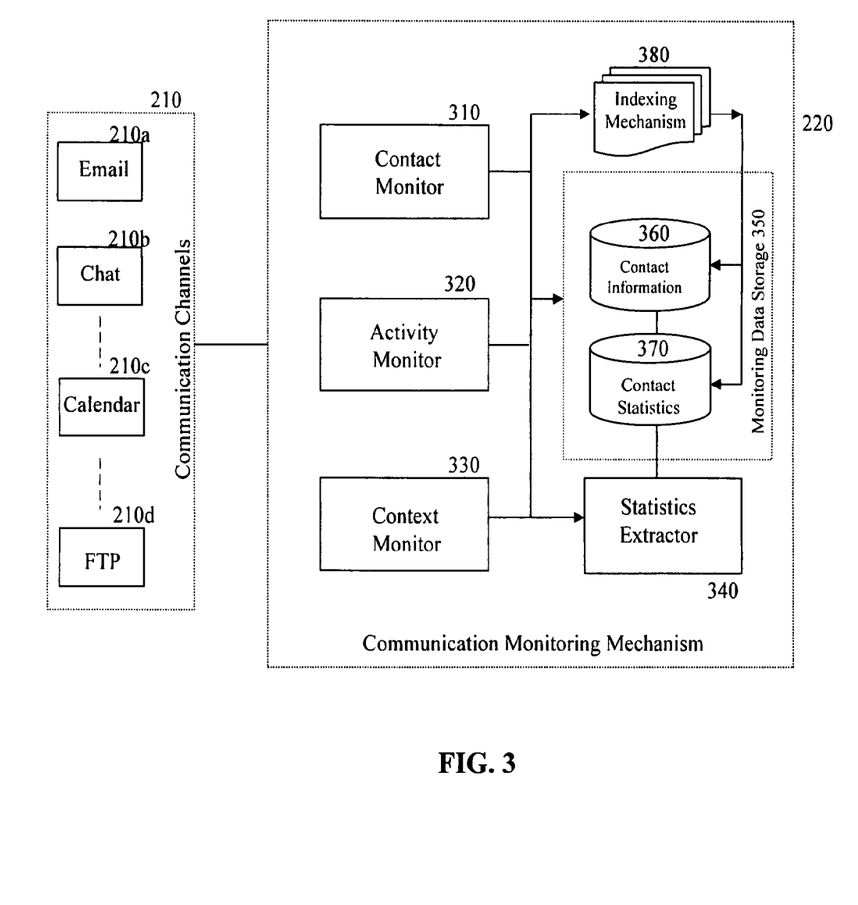
FIG. 3 depicts the high level internal structure of a communication monitoring mechanism that monitors the communication activities occurred in different exemplary communication channels, according to an embodiment of the present invention.

FIGS. 3-6 show exemplary internal structures of different components of the automatic networking response mechanism 110 and how these components interact with each other. FIG. 3 depicts the high level internal structure of the communication monitoring mechanism 220 that monitors the communication activities occurred during communication sessions, according to an embodiment of the present invention. The communication monitoring mechanism 220 includes a contact monitor 310, an activity monitor 320, a context monitor 330, a statistics extractor 340, a monitoring data storage 350, and a indexing mechanism 380.

The contact monitor 310 keeps track of the identity information of the user's contacts, which may include user names, login names, or IDs of the communication device that contacts use to communicate with the user. Such identity information may be used by the indexing mechanism 380 to establish proper indices between contacts and their corresponding communication information. The activity monitor 320 records communication activities during communication sessions and collects the information associated with such activities. For example, the activity monitor 320 may record the communication channel used (e.g., email or chat room).

The context monitor 330 captures the context of communication sessions under which a contact connects to the user. Such context information may include who initiated the connection (either the contact or the user) at what time and on what day, how long the session lasts, or the user's location at the time of the communication (e.g., shopping mall or doctor's office). While the activity monitor 320 and the context monitor 330 may merely log information during communication sessions, such recorded information may collectively provide a useful basis for characterizing the communication pattern of both the user and between the user and any particular contact. For example, a particular contact often communicates with the user via email during the day-time for a short period and chats with the user via on-line chat room at evening times for a much longer period of time The information collected by the three monitors (310, 320, and 330) may be stored of the contact information storage 360 in the monitoring data storage 350 and at the same time may be fed to the statistics extractor 340. The information may be properly indexed based on, for example, the contacts' identity information. With indices, the stored information can be efficiently retrieved from the monitoring data storage 350.

The statistics extractor 340 computes statistics from the information collected during different communication sessions (e.g., contact information, communication activities, and context). Such statistics may be designed to characterize the relationship between the user and the contacts. For example, communication frequency between the user and each contact may be computed to indicate how closely the user is related to a contact. The most preferred communication channel with a particular contact may also be inferred from the recorded monitoring data. A particular contact may connect with the user every Monday morning via email during working hours. A different contact usually connects with the user when the user is in the shopping mall via FTP connection to exchange data. Yet another different contact may conduct only one way communication with the user (downloading data to the user).

Statistics may be dynamically updated whenever new monitoring information is collected. For example, the frequency of email exchange with a particular contact may be computed based on the last 50 emails and it may need to be updated whenever new email communications occur. The computed statistics are stored in the contact statistics storage 370, which may also be properly indexed and linked to the corresponding contact information stored in 360.

Figure 4:
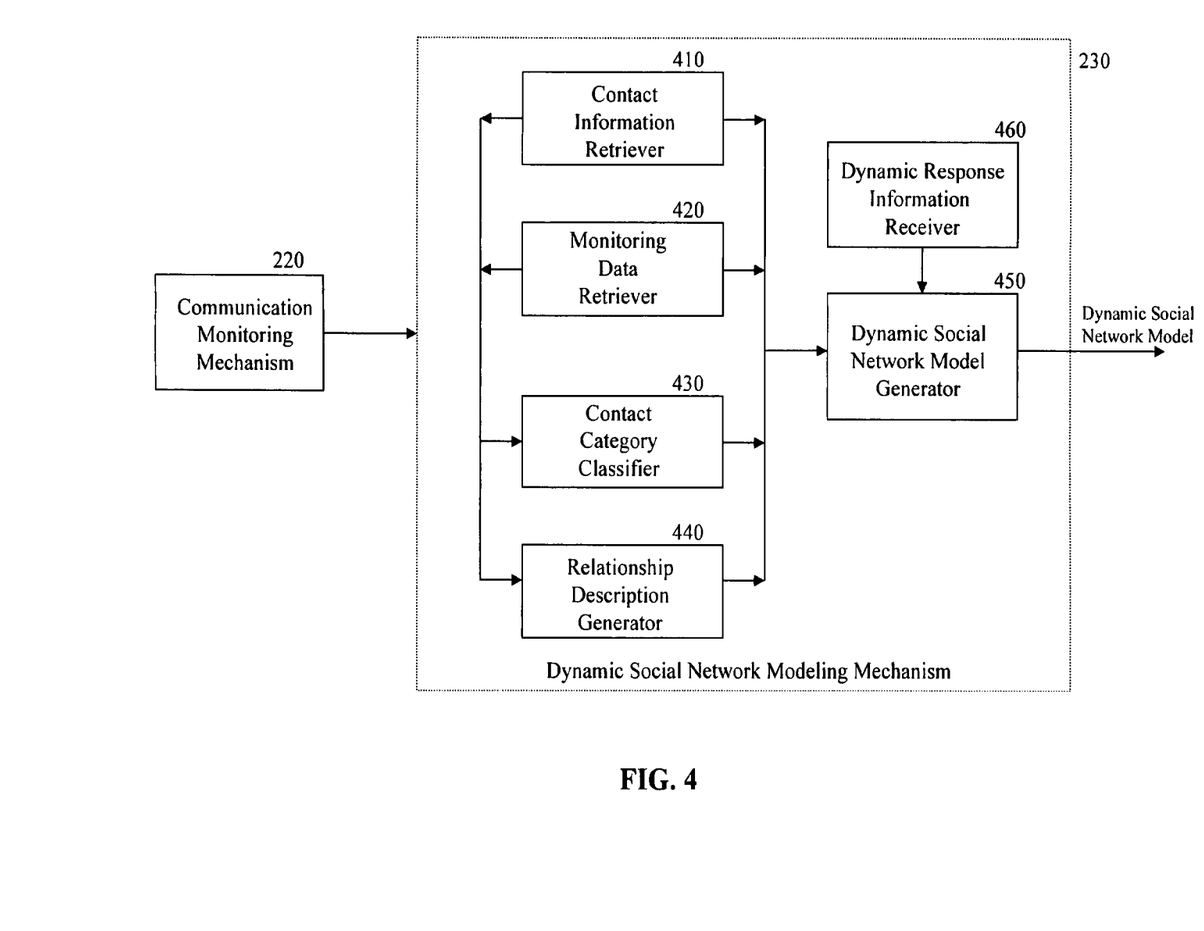
FIG. 4 depicts the high level internal structure of a dynamic social network modeling mechanism according to an embodiment of the present invention.

FIG. 4 depicts the high level internal structure of the dynamic social network modeling mechanism 230 according to an embodiment of the present invention. The dynamic social network modeling mechanism 230 comprises a contact information retriever 410, a contact statistics retriever 420, a contact category classifier 430, a relationship description generator 440, a dynamic social network model generator 450, and a dynamic response information receiver 460.

The dynamic social network modeling mechanism 230 creates a social network model 240 with respect to a (generic) single user based on the monitoring data collected by the communication monitoring mechanism 220. The social network model 240 may be created as a collection of contacts. Each of the contacts may be individually characterized according to the communication pattern between the user and the contact. The dynamic social network modeling mechanism 230 may also dynamically update the social network model 240 over the time based on new information collected from on-going communications between the user and his/her contacts.

To model the social network of a user, the dynamic social network modeling mechanism 230 accesses the monitoring data related to various contacts from the monitoring data storage 350 (in the communication monitoring mechanism 220). The user's identity information may be used as an index to identify appropriate pool of recorded information. The contact information retriever 410 retrieves various types of information about the contact, including the identity of the contact (e.g., login name) or the identity of the communication device that the contact uses to communicate with the user.

Using the retrieved contact identity as an index, the contact statistics retriever 420 further accesses the monitoring data and statistics associated with the contact. The information retrieved by both the contact information retriever 410 and the contact statistics retriever 420 provides a basis to model the relationship between the user and the contact.

According to the exemplary embodiments of the present invention, the contact category classifier 430 utilizes the retrieved monitoring data to classify the contact. For example, a contact may be classified as the user's friend or co-worker. The classification may be performed based on some pre-determined criteria, which may be specified by the user. For example, communication channel "chat room" may be specified as strictly for friends but not for co-workers. Based on such specified criterion and the monitoring data, which records the communication channel used in each communication session, the contact category classifier 430 may classify those contacts who communicate with the user via chat room as friends.

The relationship between the user and a contact may be further characterized in terms of how close the relationship is. For example, a contact that communicates with the user on a daily basis may have a closer relationship to the user than a contact that connects with the user every several months. Based on this criterion and the recorded communication frequency, the relationship description generator 440 may rank the relationship between the user and each contact.

The criteria used for the rank and the ranking scheme itself may be pre-determined either automatically (as default) or manually by the user. For example, a default ranking scheme may specify that there are a total of four ranks: not close, pretty close, close, and very close. Each of the ranks may be associated with one or more criteria that specify the semantic meaning of the rank. For example, a relationship may be considered as "close" only when there are at least one communication session via any communication channel each week.

Figure 5:
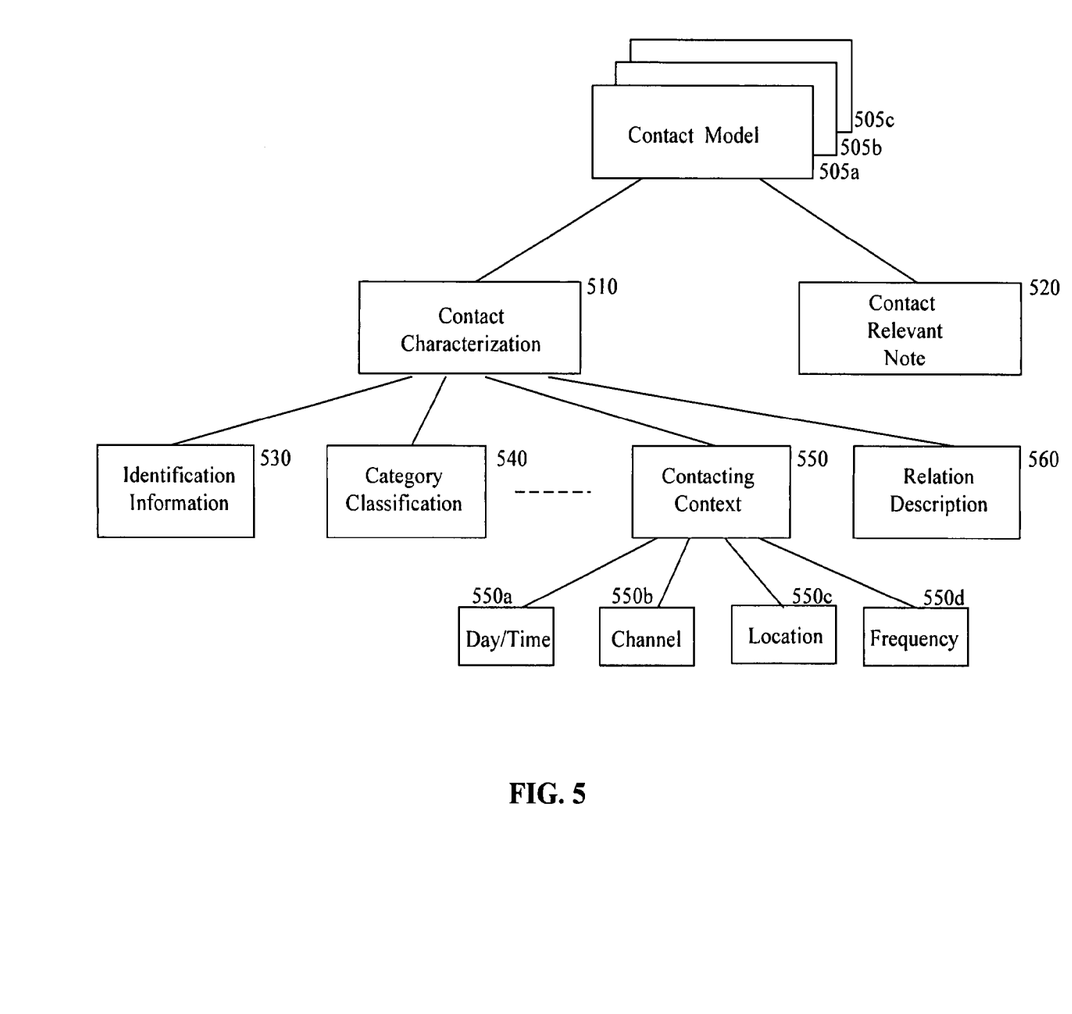
FIG. 5 shows an exemplary construct of a dynamic social network model.

Based on the retrieved information (from 410 and 420), the classified category information (from 430), and the relationship ranking information (from 440), the dynamic social network model generator 450 may generate a contact model for each contact, describing the relationship between the user and the contact. The collection of such models corresponds to the social network model 240 of the user. FIG. 5 shows an exemplary construct of a dynamic social network model. A dynamic social network model may comprise a set of contact models 505a, 505b, ..., 505c. Each of the contact models may include contact characterization 510 and contact relevant note 520. The former may comprise description of the contact as well as various aspects of the relationship between the user and the underlying contact. The latter may include specific instructions from the user regarding preferred response with respect to the contact. For example, the user may specify to send a special message to the contact, whenever the contact attempts to reach the user during a particular period of time (e.g., one month), informing the contact a particular status about the user (e.g., out of town).

According to the exemplary construct illustrated in FIG. 5, the contact characterization 510 comprises identification information 530, category classification 540, contacting context 550, and a relationship description 560. The identification information 530 may specify the login name of the contact and the communication device that the contact often uses to contact the user. The category classification 540 may contain a label indicating the nature of the relationship between the contact and the user (e.g., a friend or a business contact or unclear as default).

The contacting context 550 may describe the usual context under which the contact and the user interact with each other. A usual context may be understood based on the monitoring data collected from various communication sessions between the user and the contact. Statistical approaches may be applied to derive the usual context from such monitoring data.

For example, statistical distributions of communication sessions may be computed with respect to both day and time and the mean of the distribution (where most instances occur) may be used as the preferred communicating time/day between the user and the contact.

While the usual context can be inferred statistically from monitoring data, some confidence test may be applied to make sure that the derived usual context statistically makes sense and represents the communication pattern between the user and the contact. For example, if the confidence test fails with respect to a computed preferred day/time, a null value may be assigned to the preferred day/time in the model to indicate that there is no obvious pattern detected with respect to preferred communicating day/time.

In FIG. 5, the usual context 550 includes day/time 550a, channel 550b, location 550c (of the user), and frequency 550d. Such collective information characterizes the communication habit between the user and the contact and may be utilized in making a response decision. For example, if the automatic networking response mechanism 110 intercepts a networking request from a contact at a time of a day that is very different from the usual day/time specified in the contact model, the automatic networking response mechanism 110 may either decide to reject the request or prompt the user to make a decision.

Referring again to FIG. 4, the dynamic social network modeling mechanism 230 may also update an existing social network model based on new information. For example, the frequency 550d associated with a contact may need to be updated whenever a new communication session is established between the contact and the user. In this case, the dynamic response information receiver 460 receives the information about a new communication session, including with which contact the user is communicating, and the data relevant to the communication session such as the time, date, communication channel, and the location of the user. The dynamic response information receiver 460 passes the received information to the dynamic social network model generator 450 that may then retrieve corresponding existing social network model and update the model based on the new information.

Figure 6:
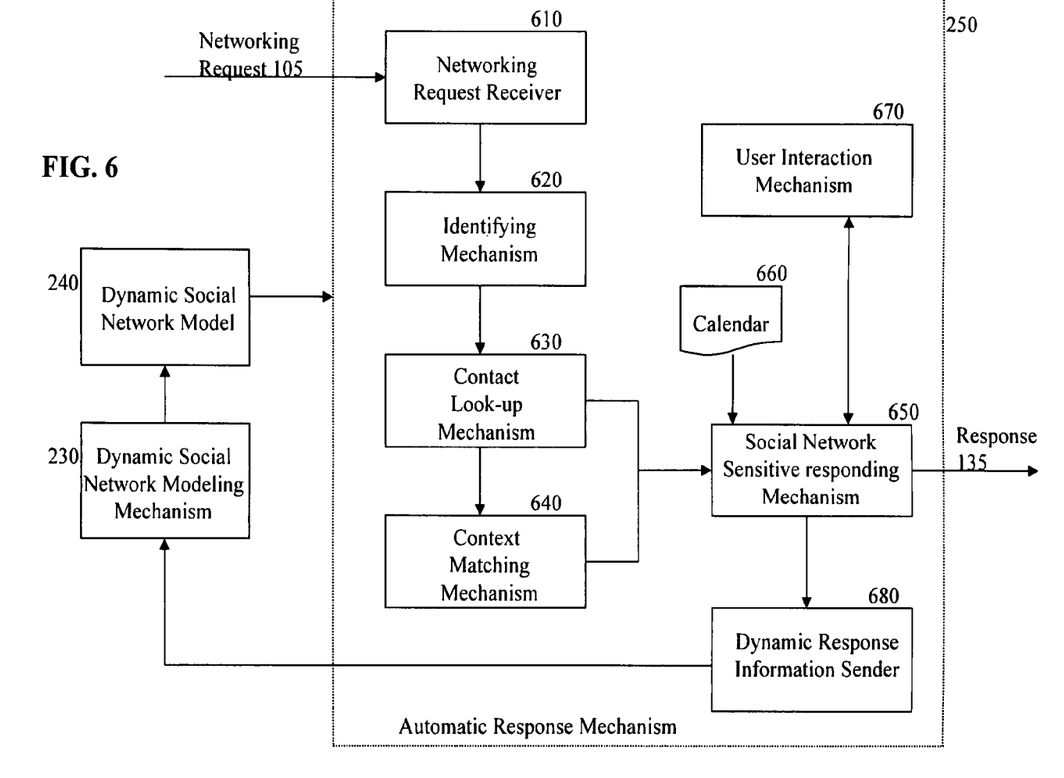
FIG. 6 depicts the high level internal structure of a networking request responding mechanism according to an embodiment of the present invention.

FIG. 6 depicts the high level internal structure of the automatic response mechanism 250 in relation to the dynamic social network model 240 and the dynamic social network modeling mechanism 230, according to an embodiment of the present invention. The automatic response mechanism 250 generates a response 135 to a networking request 105 based on a dynamic social network model 240 and then triggers the dynamic social network modeling mechanism 230 to update the existing social network model based on the response.

The automatic response mechanism 250 comprises a networking request receiver 610, an identifying mechanism 620 to identify the contact who issues the request, a contact look-up mechanism 630, a context matching mechanism 640, a social network sensitive responding mechanism 650, a calendar 660, a user interaction mechanism 670, and a dynamic response information sender 680. The networking request receiver 610 intercepts a networking request 105. Such a networking request may be sent wirelessly to a user to request a connection. The request 105 may also be sent in a broadcast (or multicast) fashion to request all the recipients to respond to form an ad hoc network.

Upon receiving the networking request 105, the identifying mechanism 620 identifies both the sender of the request (the initiating party) and the designated recipient (a user of the underlying communication device). The resulted identification information is then fed to the contact look-up mechanism 630 that examines whether the initiating party is one of the contacts of the user. Specifically, the contact look-up mechanism 630 may use the identity of the user to retrieve an appropriate social network model and then determine whether the initiating party is one of the contacts modeled in the retrieved social network model.

If the initiating party is identified as one of the contacts of the user, the context matching mechanism 640 may further verify whether the current context under which the networking request is issued is consistent with the preferred context characterized in the retrieved social network model. For example, if the preferred day/time is during working hours (e.g., 8:00 am to 7:00 pm) on a working day (e.g., Monday through Friday), a networking request sent on a weekend day may be considered as a mismatch. If the contact normally connects to the user a few time a month and a previous communication session with the contact was just a few hours before (i.e., current communication frequency is much higher than usual), the current frequency may be considered as inconsistent with the model.

Based on the look-up results and the context matching results, the social network sensitive responding mechanism 650 generates a response 135. The decision about the response 135 may be reached by looking up a calendar 660 that may record scheduled activities of the user. For example, if there is an engagement scheduled in the next few minutes for the user, the networking request may be refused. The social network sensitive responding mechanism 650 may also look up user's social network model to see whether there is a special note about the initiating party. For example, the user may insert a note in the contact model to instruct to refuse any networking request from this contact.

When the current context does not match the preferred context, the social network sensitive responding mechanism 650 may decide to consult with the user, via the user interaction mechanism 670, in terms of whether the networking request should be accepted. The user interaction mechanism 670 may prompt the user, informing the incoming networking request as well as other relevant information such as the identity of the contact who makes the request and the requested communication channel. The user interaction mechanism 670 acquires the user's decision on whether to accept the request and send it to the social network sensitive responding mechanism 650.

Based on different types of information (e.g., the networking request, the social network model, the calendar, and the user), the social network sensitive responding mechanism 650 generates the response 135 and sends it to the requester. At the same time, information relevant to the response 135 (e.g., day, time, starting time, contact, communication channel, etc.) is sent to the dynamic social network modeling mechanism via the dynamic response information sender 680 to trigger updating the existing social network model of the user. In this way, the dynamics of the communication between the user and the contact can be incorporated into the social network model.

Figure 7:
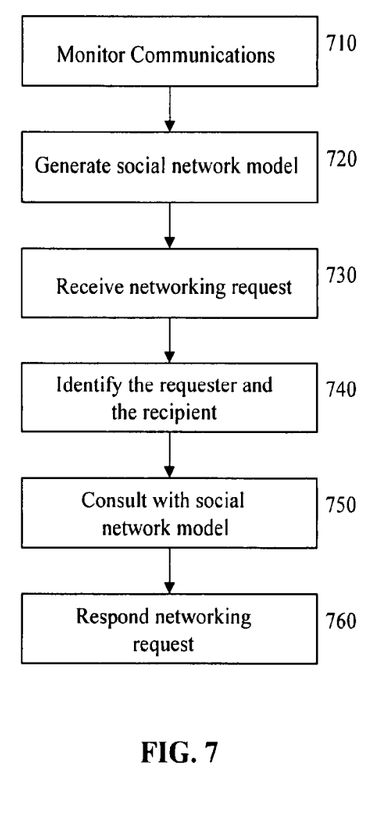
FIG. 7 is an exemplary flowchart of a process, in which a communication device automatically responds a networking request based on a dynamic social network model, according to embodiments of the present invention.

FIG. 7 is an exemplary flowchart of a process, in which a communication device automatically responds to a networking request via an automatic networking response mechanism based on a dynamic social network model, according to embodiments of the present invention. Communications between a user of the communication device 120 and his/her contacts are monitored at act 710 to collect monitoring data. Based on the monitoring data, a social network model is generated at act 720. A networking request is received at act 730. The identities of both the initiating party that sends the request and the recipient are identified at act 740. The identity of the recipient (or the user) is used to retrieve an appropriate social network model. To determine a response, the automatic networking response mechanism 110 consults, at act 750, the social network model 240 to verify whether the initiating party is one of the user's contacts and whether the context under which the networking request is issued is consistent with the model. Finally, the automatic networking response mechanism 110 responds, at act 760, the networking request based on the consultation result.

Figure 8:
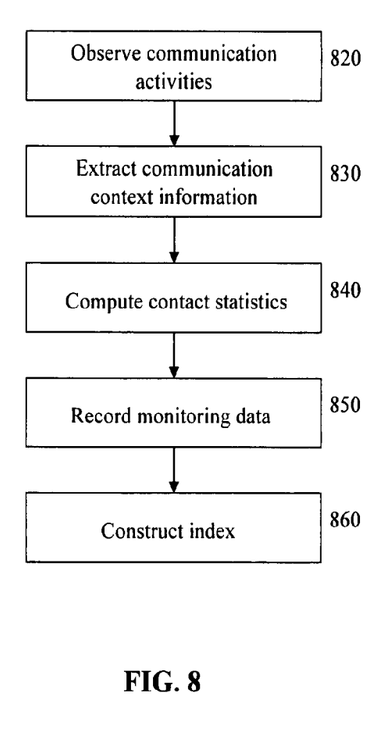
FIG. 8 is an exemplary flowchart of a process, in which a communication monitoring mechanism monitors communication sessions and collects useful data, according to an embodiment of the present invention.

FIG. 8 is an exemplary flowchart of a process, in which the communication monitoring mechanism 220 monitors communication sessions to collect useful monitoring data, according to an embodiment of the present invention. During a communication session between a user and a contact, communication activities are observed at act 820. Context information related to the communication session is extracted at act 830. Various relevant statistics are further computed at act 840. Such gathered information is then stored, at act 850, in the monitoring data storage 350. To facilitate efficient retrieval of stored monitoring data, appropriate indices are constructed at act 860.

Figure 9:
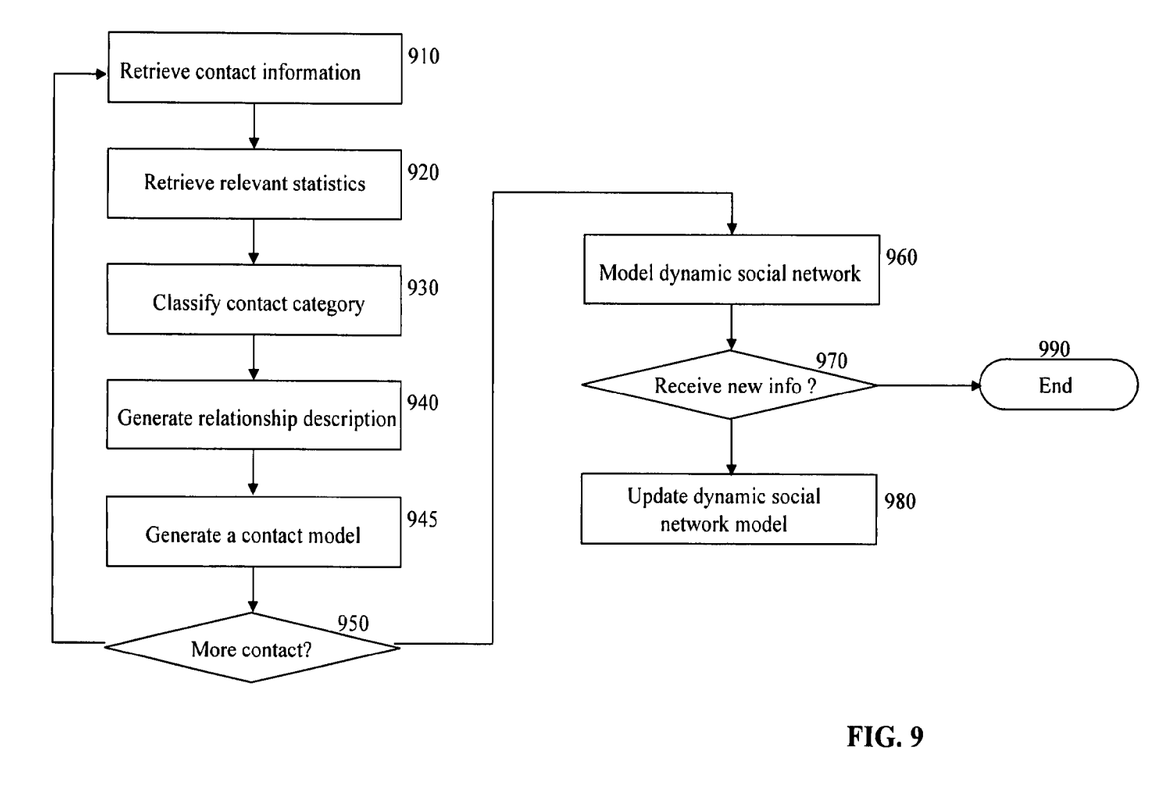
FIG. 9 is an exemplary flowchart of a process, in which a dynamic social network modeling mechanism constructs and maintains a social network model based on monitoring data collected during communication sessions, according to an embodiment of the present invention.

FIG. 9 is an exemplary flowchart of a process, in which the dynamic social network modeling mechanism 230 establishes and maintains a dynamic social network model based on monitoring data collected during user's communication sessions, according to an embodiment of the present invention. To construct a social network model for a user, for each of the user's contacts, contact information is first retrieved at act 910. Relevant statistics are further retrieved at act 920. Based on the retrieved information, the dynamic social network modeling mechanism 230 classifies, at act 930, the contact into one of a plurality of categories, specifying the nature of the relationship between the contact and the user. In addition, a relationship description is generated, at act 940, that specifies the closeness of the relationship between the user and the contact.

Using the monitoring data, the category information, and the relationship description, the dynamic social network modeling mechanism 230 builds, at act 945, a contact model. The acts between 910 and 945 are repeated for each of the user's contacts. When contact models are built for all the contacts, determined at act 950, the dynamic social network modeling mechanism 230 models, at act 960, the user's overall social network. Once the dynamic social network model for the user is created, it is dynamically maintained and updated. Whenever new information is received, determined at act 970, the corresponding dynamic social network model is updated at act 980.

Figure 10:
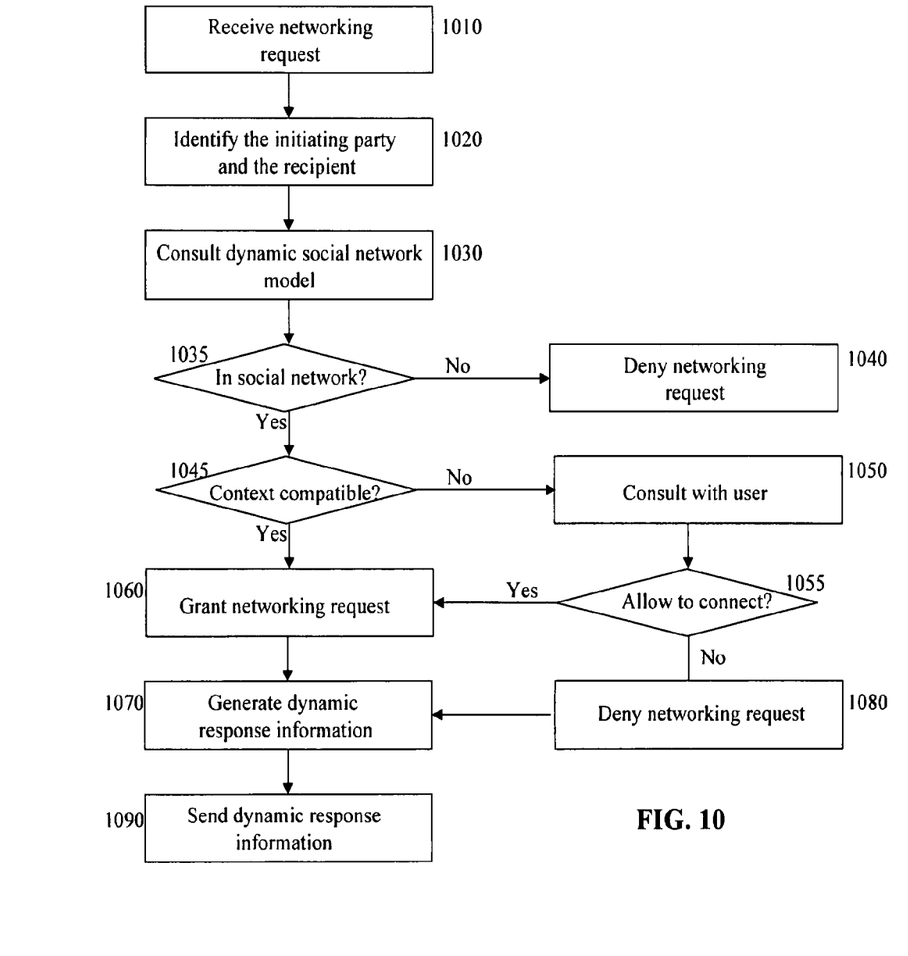
FIG. 10 is an exemplary flowchart of a process, in which a networking request responding mechanism determines how to respond a networking request based on a dynamic social network model, according to embodiments of the present invention.

FIG. 10 is an exemplary flowchart of a process, in which the networking request responding mechanism 250 automatically responds to a networking request based on a dynamic social network model, according to embodiments of the present invention. A networking request is received at act 1010. The identities of both the initiating party and the request recipient are identified at act 1020. Based on the identity of the recipient (user), an appropriate social network model is retrieved. The networking request responding mechanism 250 then consults, at act 1030, with the social network model with respect to the identity of the initiating party.

If the initiating party is identified as one of the user's contacts, determined at act 1035, the current context under which the contact issues the networking request is compared with the preferred context specified in the social network model to see whether they are consistent. If the initiating party is not one of the user's contacts, the networking request responding mechanism 250 denies, at act 1040, the networking request.

If the current context matches with the preferred context, determined at act 1045, the networking request responding mechanism 250 grants, at act 1060, the networking request. If the current context does not match the preferred context, the networking request responding mechanism 250 consults, at act 1040, with the user. If the user allows the requested connection, determined at act 1055, the networking request responding mechanism 250 grants the networking request. If the user refuses the requested connection, the networking request responding mechanism 250 denies, at act 1080, the networking request. In both cases (grant or deny the networking request), the networking request responding mechanism 250 generates, at act 1070, information related to the response. Such information is then sent, at act 1090, to the dynamic social network modeling mechanism 230 to trigger a dynamic update on the relevant social network model.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A computer-implemented method for automatically filtering communication, the method comprising:
receiving a request for communication over a communication channel at a recipient communication device from an initiating party using an initiating communication device, wherein the request for communication is addressed to a user of the recipient communication device;
in response to receiving the request for communication, automatically determining whether the initiating party is already recognized as a contact of the user of the recipient communication device;
automatically denying the request for communication in response to a determination that the initiating party is not a known contact of the user of the recipient communication device;
monitoring prior communications between the user of the recipient communication device and a plurality of contacts; and
generating a social networking model for the user of the recipient communication device based on results of monitoring the prior communications, wherein the social networking model contains identity information for contacts of the user of the recipient communication device;
wherein the operation of automatically determining whether the initiating party is already recognized as the contact of the user of the recipient communication device comprises searching the social networking model to determine whether the initiating party is already recognized as a contact of the user.

2. The method of claim 1, wherein the request for communication comprises a telephone call.

3. The method of claim 1, wherein the request for communication comprises an instant messaging request.

4. The method of claim 1 further comprising:
dynamically updating the social networking model for the user of the recipient communication device by updating statistics for the prior communications.

5. A computer program product comprising:
a non-transitory computer-readable storage medium; and
instructions in the computer-readable storage medium, wherein the instructions, when executed in a processing system, enable the processing system to perform operations comprising:
receiving a request for communication over a communication channel at a recipient communication device from an initiating party using an initiating communication device, wherein the request is addressed to a user of the initiating communication device;
in response to receiving the request for communication, automatically determining whether the initiating party is already recognized as a contact of the user of the recipient communication device;
automatically denying the request for communication in response to a determination that the initiating party is not a known contact of the user of the recipient communication device;
monitoring prior communications between the user of the recipient communication device and a plurality of contacts; and
generating a social networking model for the user of the recipient communication device based on results of monitoring the prior communications, wherein the social networking model contains identity information for contacts of the user of the recipient communication device;
wherein the operation of automatically determining whether the initiating party is already recognized as the contact of the user of the recipient communication device comprises searching the social networking model to determine whether the initiating party is already recognized as a contact of the user.

6. The computer program product of claim 5, wherein the request for communication comprises a telephone call.

7. The computer program product of claim 5, wherein the request for communication comprises an instant messaging request.

8. The computer program product of claim 5, wherein the instructions further cause the processing system to perform operations comprising:
dynamically updating the social networking model for the user of the recipient communication device by updating statistics for the prior communications.

9. A processing system comprising:
a processor; and
a memory comprising instructions to execute on the processor, wherein the instructions, when executed by the processor, enable the processing system to perform operations comprising:
receiving a request for communication over a communication channel at a recipient communication device from an initiating party using an initiating communication device, wherein the request is addressed to a user of the recipient communication device;
in response to receiving the request for communication, automatically determining whether the initiating party is already recognized as a contact of the user of the recipient communication device;

automatically denying the request for communication in response to a determination that the initiating party is not a known contact of the user of the recipient communication device;

monitoring prior communications between the user of the recipient communication device and a plurality of contacts; and generating a social networking model for the user of the recipient communication device based on results of monitoring the prior communications, wherein the social networking model contains identity information for contacts of the user of the recipient communication device;

wherein the operation of automatically determining whether the initiating party is already recognized as the contact of the user of the recipient communication device comprises searching the social networking model to determine whether the initiating party is already recognized as a contact of the user.

10. The system of claim 9, wherein the communication comprises a telephone call.

11. The system of claim 9, wherein the communication comprises an instant messaging request.

12. The system of claim 9, wherein the instructions further cause the processor to perform operations comprising:

dynamically updating the social networking model for the user of the recipient communication device by updating statistics for the prior communications.

\* \* \* \* \*

UNITED STATES PATENT AND TRADEMARK OFFICE
CERTIFICATE OF CORRECTION

| | |
|---|---|
| PATENT NO. | : 8,868,653 B2 |
| APPLICATION NO. | : 12/978016 |
| DATED | : October 21, 2014 |
| INVENTOR(S) | : Jose P. Puthenkulam et al. |

Page 1 of 1

It is certified that error appears in the above-identified patent and that said Letters Patent is hereby corrected as shown below:

IN THE CLAIMS:

In column 11, line 63, In Claim 1, after "contact" insert -- of --.

Signed and Sealed this
Third Day of March, 2015

Michelle K. Lee
*Deputy Director of the United States Patent and Trademark Office*